(12) United States Patent
Kosaka et al.

(10) Patent No.: US 9,145,183 B2
(45) Date of Patent: Sep. 29, 2015

(54) ADJUSTABLE BICYCLE ELECTRIC CONTROL DEVICE

(71) Applicant: SHIMANO INC., Sakai-ku, Sakai, Osaka (JP)

(72) Inventors: Kentaro Kosaka, Sakai (JP); Yoshimitsu Miki, Sakai (JP)

(73) Assignee: SHIMANO INC., Sakai (JP)

( * ) Notice: Subject to any disclaimer, the term of this patent is extended or adjusted under 35 U.S.C. 154(b) by 166 days.

(21) Appl. No.: 13/679,636

(22) Filed: Nov. 16, 2012

(65) Prior Publication Data

US 2014/0137696 A1    May 22, 2014

(51) Int. Cl.
*B62K 23/06* (2006.01)
*B62M 25/08* (2006.01)

(52) U.S. Cl.
CPC ............... *B62K 23/06* (2013.01); *B62M 25/08* (2013.01); *Y10T 74/20612* (2015.01); *Y10T 74/20822* (2015.01)

(58) Field of Classification Search
CPC ........ B62K 23/02; B62K 23/06; B62M 25/08
See application file for complete search history.

(56) References Cited

U.S. PATENT DOCUMENTS

| | | | |
|---|---|---|---|
| 7,854,180 B2 | 12/2010 | Tetsuka | |
| 7,878,089 B2 * | 2/2011 | McLaughlin et al. | ........ 74/502.2 |
| 8,061,667 B2 * | 11/2011 | Weiss et al. | ................ 248/230.4 |
| 2006/0053940 A1 * | 3/2006 | McLaughlin et al. | ....... 74/502.2 |
| 2006/0096404 A1 * | 5/2006 | Wessel et al. | ................ 74/501.6 |
| 2007/0207885 A1 * | 9/2007 | Watarai | .......................... 474/70 |
| 2013/0152726 A1 * | 6/2013 | Miki et al. | ................... 74/551.9 |

* cited by examiner

*Primary Examiner* — Edwin A Young
(74) *Attorney, Agent, or Firm* — Jeffer Mangels Butler & Mitchell LLP; Brennan C. Swain, Esq.

(57) ABSTRACT

An electric control device for a bicycle that includes a clamp member adapted to be mounted to a bicycle handlebar, a bracket member adjustably mounted to the clamp member, and a first electric user interface member operatively coupled to the bracket member.

20 Claims, 10 Drawing Sheets

FIG. 11

ADJUSTABLE BICYCLE ELECTRIC CONTROL DEVICE

FIELD OF THE INVENTION

The present invention relates to a bicycle electric control device, and more specifically to a bicycle electric control device that is adjustable.

BACKGROUND OF THE INVENTION

There are known bicycle control devices for controlling various aspects of the bicycle, such as shifting or braking. For example, many shifting devices are electric powered and configured such that they can be controlled electrically so as to change among a plurality of gear positions (e.g., U.S. Pat. No. 7,854,180 to Tetsuka, the entirety of which is incorporated herein by reference). These types of devices include electric switches and can be mounted to a handlebar. However, due to the differences in size of riders' hands, it is desirable to provide adjustability of the positioning of the user interface devices or switches.

In view of the above, there exists a need for an improved bicycle electric control device. This invention addresses this need in the art as well as other needs, which will become apparent from this disclosure to those skilled in the art.

SUMMARY OF THE PREFERRED EMBODIMENTS

In accordance with a first aspect of the present invention there is provided an electric control device for a bicycle that includes a clamp member adapted to be mounted to a bicycle handlebar, a bracket member adjustably mounted to the clamp member, and a first electric user interface member operatively coupled to the bracket member. In a preferred embodiment, the bracket member is displaceable relative to the clamp member in at least a first adjustment direction. Preferably, one of the clamp member and the bracket member includes a guide portion that extends in the first adjustment direction, and the other of the clamp member and the bracket member is operatively associated with the guide portion and is therefore displaceable in the first adjustment direction. The guide portion includes an elongated bore defined therein that extends generally in the first adjustment direction. In a preferred embodiment, the electric control device includes a fastener that extends through the elongated bore and is fixed to the other of the clamp member and the bracket member. Preferably, one of the clamp member and the bracket member has protruding portion, the guide portion includes a channel portion, and the protruding portion is received in the channel portion such that the protruding portion slides along the channel portion in the first adjustment direction. Preferably, the electric control device includes first and second electric switch units that are attached to the bracket member and are operated by the first and second electric user interface members. In a preferred embodiment, the first and second electric user interface members include lever members that each pivot about a lever axis.

In a preferred embodiment, the guide portion includes at least first and second adjustment openings defined therein. A fastener extends through one of the first and second adjustment openings and is fixed to the one of the clamp member and the bracket member. The position of the bracket member can be adjusted by extending the fastener through the other of the first and second adjustment openings.

In a preferred embodiment, the clamp member includes a band part that is adapted to be fixed to the bicycle handlebar and that defines a center axis. In this embodiment, the first adjustment direction is an angular direction relative to the center axis of the band part.

In a preferred embodiment, the protruding portion is received in the channel portion, and the guide portion further includes a threaded shaft that spans the length of the channel portion and extends through a threaded bore defined in the protruding portion. When the threaded shaft is rotated, the bracket member moves in the first adjustment direction.

In accordance with another aspect of the present invention there is provided an electric control device that is associated with a clamp member that is adapted to be mounted to a bicycle handlebar. The electric control device includes a bracket member adjustably mounted to the clamp member, and a first electric user interface member operatively coupled to the bracket member.

In accordance with yet another aspect of the present invention there is provided an electric control device for a bicycle that includes a clamp member that is adapted to be mounted to a bicycle handlebar, a brake operating member operatively mounted to the clamp member, a bracket member detachably mounted to the clamp member, and an electric control member including a user interface member. The electric control member operatively coupled to the bracket member.

The invention, together with additional features and advantages thereof, may be best understood by reference to the following description.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
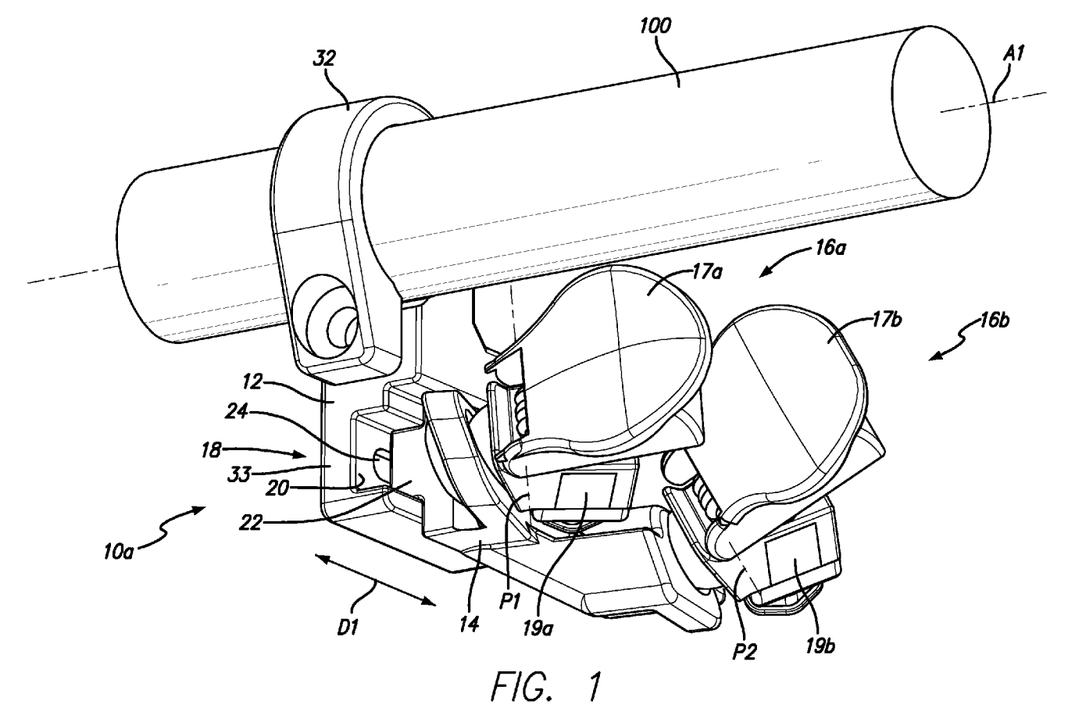
FIG. 1 is a perspective view of an electric control device in accordance with a preferred embodiment of the present invention.

Referring initially to FIGS. 1-3B, an electric control device 10a for a bicycle is illustrated in accordance with an embodiment of the present invention. In a preferred embodiment, the electric control device 10a generally includes a clamp member 12 that is adapted to be mounted to a bicycle handlebar 100, a bracket member 14 adjustably mounted to the clamp member 12, and at least one operating component or user interface member coupled to the bracket member 14. A user interface member can be, for example, a brake lever, a shift lever or button, etc. Preferably, the clamp member 12 includes a band member 32 and an extension portion 33 extending from the band member 32. As shown in FIG. 1, in a preferred embodiment, the electric control device 10a includes at least a first electric user interface member 16a operatively coupled to the bracket member 14, and preferably a second electric user interface member 16b operatively coupled thereto. The electric control device 10a is used for operating an electric bicycle component, e.g., a bicycle electric front derailleur or rear derailleur. Further, the electric control device 10a can be used for operating a plurality of electric components, e.g., an electric seat height adjusting device and an electric suspension switching device.

In a preferred embodiment, the first electric user interface member 16a includes a first lever member 17a and a first electric switch unit 19a. The first electric switch unit 19a is operatively fixed to the bracket member 14. The first lever member 17a pivots about a first lever axis P1 with respect to the first electric switch unit 19a. The first electric switch unit 19a is operated by the first lever member 17a in response to pivotal movement of the first lever member 17a. The second electric user interface member 16b includes a second lever member 17b and a second electric switch unit 19b. The second electric switch unit 19b is operatively fixed to the bracket member 14. The second lever member 17b pivots about a second lever axis P2 with respect to the second electric switch unit 19b. The second electric switch unit 19b is operated by the second lever member 17b in response to pivotal movement of the second lever member 17b.

In a preferred embodiment, the bracket member 14 is displaceable relative to the clamp member 12 in an adjustment direction D1 which corresponds to the first adjustment direction of the appended claims. The adjustment direction D1 can be any direction, and depends on the orientation of the clamp member 12 and bracket member 14, among other things. In preferred embodiments, the adjustment direction D1 is generally perpendicular to an axis A1 defined by the bicycle handlebar 100 when the control device 10 is mounted on the bicycle handlebar 100.

Figure 2:
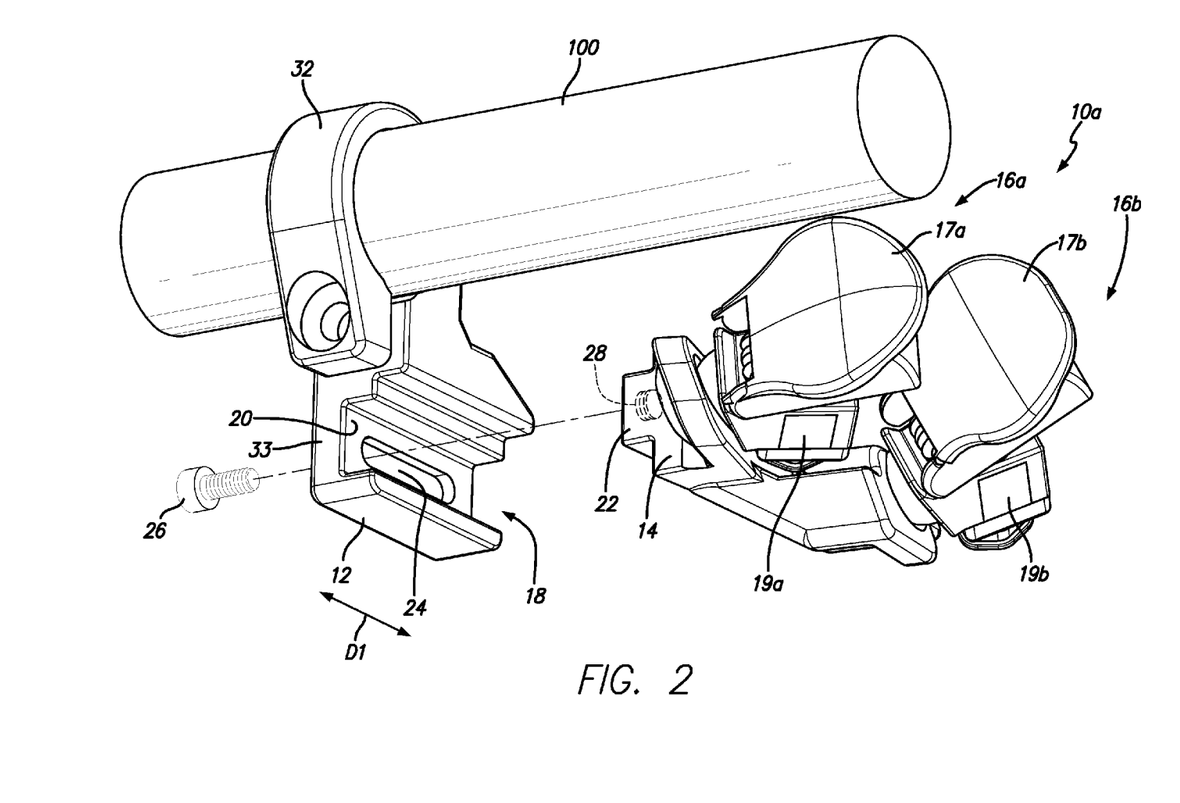
FIG. 2 is an exploded view of the electric control device of FIG. 1.

As shown in FIG. 2, the clamp member 12 includes a guide portion 18 that extends in the adjustment direction D1 and allows adjustment of the bracket member 14 in the adjustment direction D1. In a preferred embodiment, the guide portion 18 includes a channel portion 20 defined in the clamp member 12. The bracket member 14 includes a protruding portion 22 which is received in and slides along the channel portion 20 in the adjustment direction D1. As shown in FIG. 2, in a preferred embodiment, the guide portion 18 includes an elongated bore 24 defined therein that extends generally in the adjustment direction D1. The elongated bore 24 is defined in the channel portion 20 such that a fastener 26 extends through the elongated bore 24 and into an opening 28 in the protruding portion 22 to secure the bracket member 14 to the clamp member 12. More than one fastener 26 and corresponding opening 28 can be used.

Figure 3A:
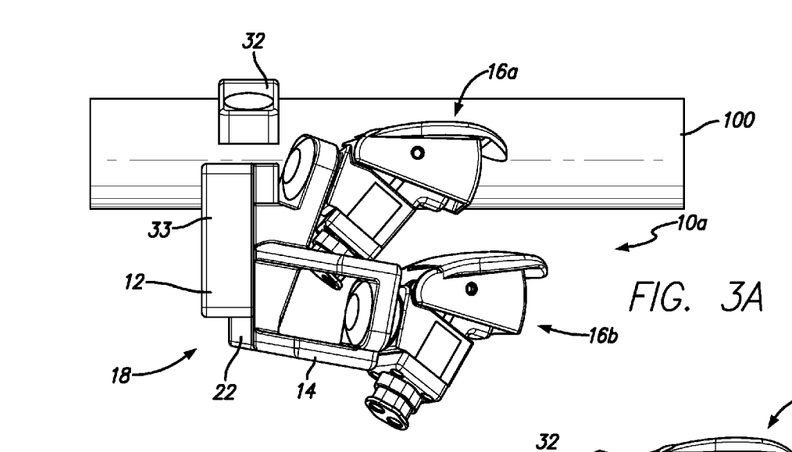
FIG. 3A is a bottom plan view of the electric control device of FIG. 1 in a first position.
Figure 3B:
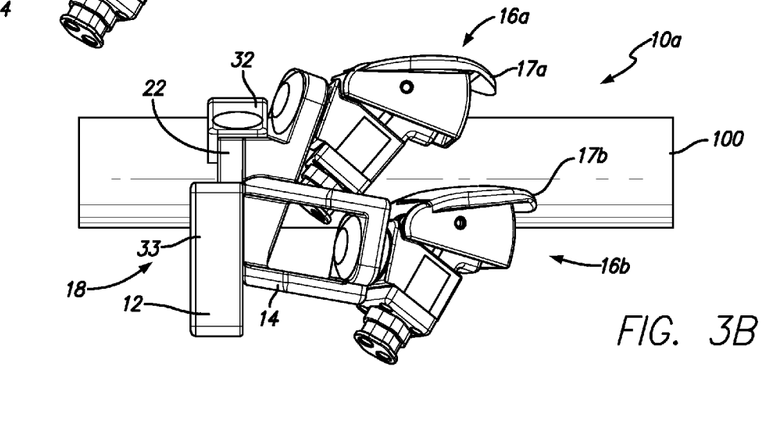
FIG. 3B is a bottom plan view of the electric control device of FIG. 1 in a second position.
Figure 4:
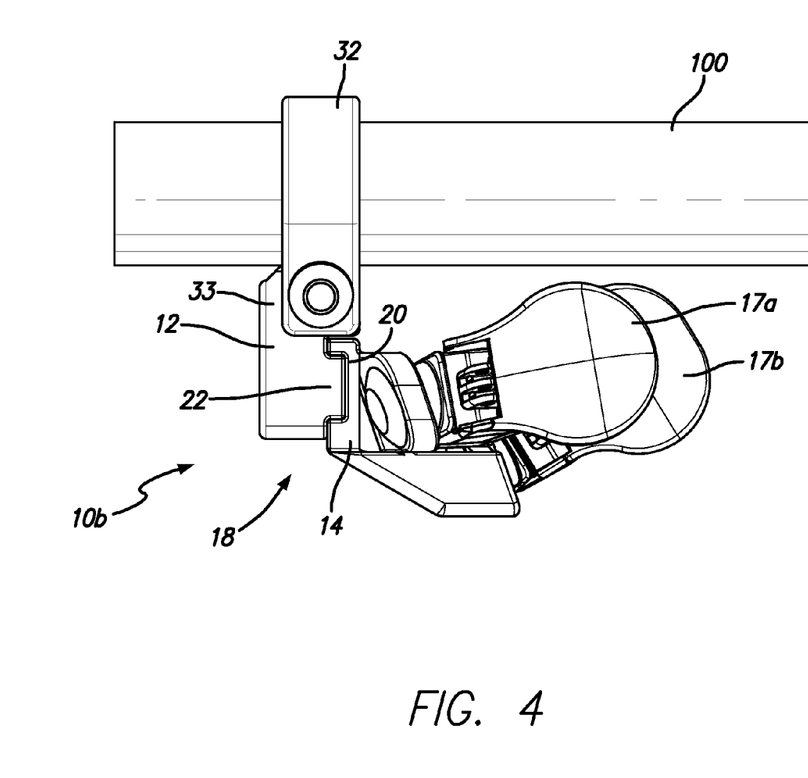
FIG. 4 is a rear elevational view of an electric control device in accordance with another preferred embodiment of the present invention.

To adjust the position of the bracket member 14, and the first and second electric user interface members 16a and 16b thereon, fastener 26 is loosened, bracket member 14 is moved in the adjustment direction D1 to the desired position (via protruding portion 22 sliding within channel portion 20), and fastener 26 is tightened. For example, FIG. 3A shows the bracket member 14 (and the first and second electric user interface members 16a and 16b thereon) in a first position and FIG. 3B shows the bracket member 14 in a second position. As shown in FIG. 4, in another embodiment of an electric control device 10b, the protruding portion 22 can be on the clamp member 12 and the guide portion 18 and channel portion 20 can be defined in the bracket member 14.

Figure 5:
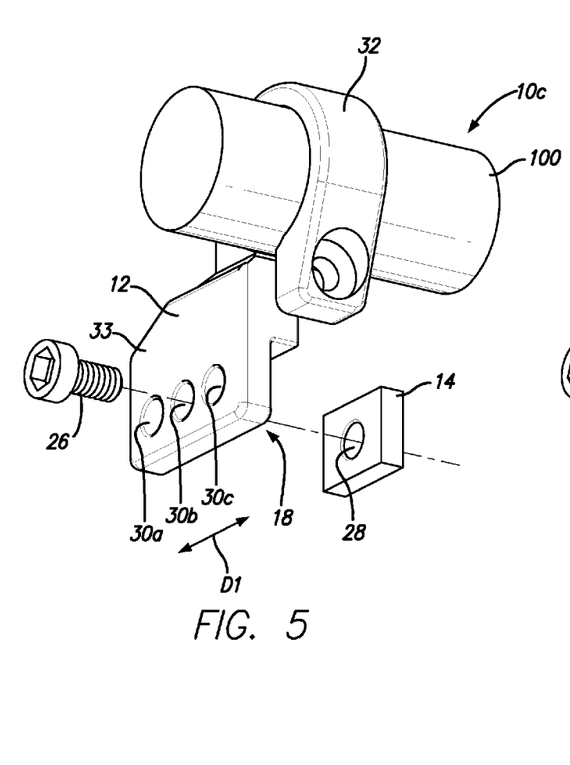
FIG. 5 is a schematic perspective view of a portion of an electric control device in accordance with another preferred embodiment of the present invention.
Figure 6:
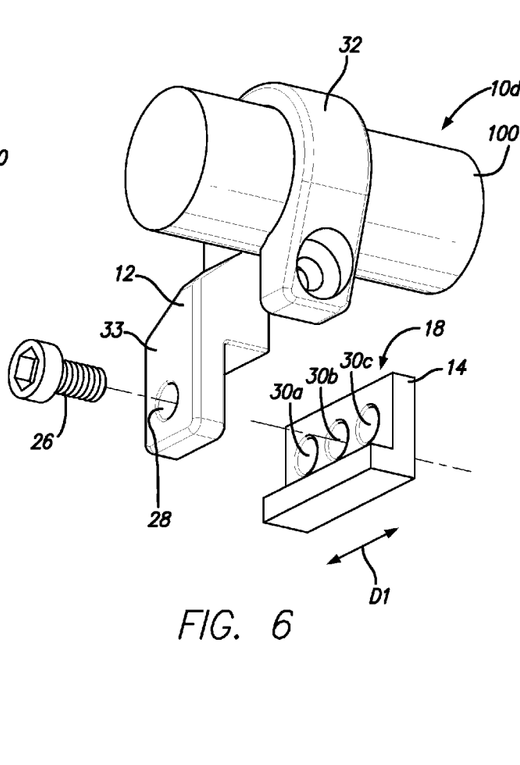
FIG. 6 is a schematic perspective vim of a portion of an electric control device in accordance with another preferred embodiment of the present invention.

FIGS. 5 and 6 show other embodiments of electric control devices 10c and 10d for a bicycle, respectively. As seen in FIG. 5, in the electric control device 10c, the guide portion 18 is provided at the clamp member 12 and includes first, second and third adjustment openings 30a, 30b and 30c defined therein. The first, second and third adjustment openings 30a, 30b and 30c of the clamp member 12 correspond to an opening 28 which is provided at the bracket member 14 (only a portion of the bracket member 14 is shown in FIG. 5). As seen in FIG. 6, in the electric control device 10d, the guide portion 18 is provided at the bracket member 14 (only a portion of the bracket member 14 is shown in FIG. 6) and includes first, second and third adjustment openings 30a, 30b and 30c defined therein. The first, second and third adjustment openings 30a, 30b and 30c of the bracket member 14 correspond to opening 28, which is provided at the clamp member 12. It will be understood that for simplicity, the electric user interface members are omitted from FIGS. 5 and 6. However, in use, at least one electric user interface member 16a is associated with the bracket member 14, as shown in FIG. 1. More or less adjustment openings can be used.

In the embodiment of the electric control device 10c shown in FIG. 5, to adjust the position of the bracket member 14, fastener 26 is removed from opening 28 and one of first, second and third adjustment openings 30a, 30b and 30c, bracket member 14 is moved in the adjustment direction D1 to the desired position, fastener 26 is extended through another of first, second and third adjustment openings 30a, 30b and 30c and opening 28, and fastener 26 is tightened.

In the embodiment of the electric control device 10d shown in FIG. 6, to adjust the position of the bracket member 14, fastener 26 is removed from one of first, second and third adjustment openings 30a, 30b and 30c and opening 28, bracket member 14 is moved in the adjustment direction D1 to the desired position, fastener 26 is extended through opening 28 and another of first, second and third adjustment openings 30a, 30b and 30c, and fastener 26 is tightened.

It will be appreciated that fastener 26 be a threaded fastener or another type of fastener that extends through elongated bore 24, opening 28 or adjustment openings 30a, 30b and 30c. For example, fastener 26 can be a rod or the like that is spring biased inwardly, and that is pulled out of the openings and then reinserted into a different opening (or a different portion of elongated bore 24) after adjustment.

Figure 7:
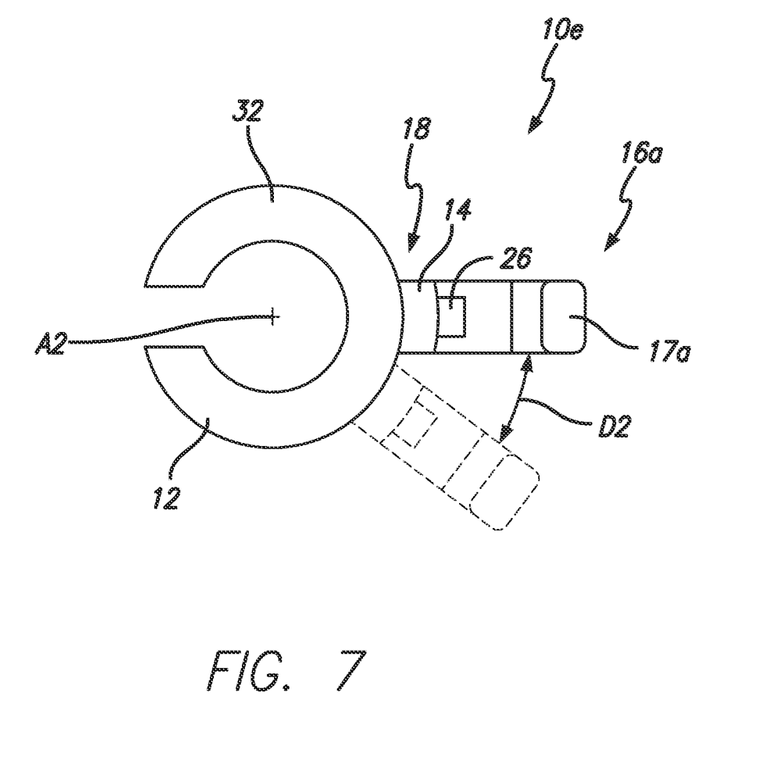
FIG. 7 is a schematic end view of an electric control device in accordance with another preferred embodiment of the present invention.

FIG. 7 shows another embodiment of an electric control device 10e for a bicycle. In this embodiment, the clamp member 12 includes a band member 32 that defines an axis A2 that is coaxial with the axis A1 when the electric control device 10e is mounted on a bicycle handlebar 100. As shown in FIG. 7, the bracket member 14 includes a fastener 26 that extends therethrough and into the band member 32. The clamp member 12 includes a guide portion 18. The position of the bracket member 14 (and the first electric user interface member 16a thereon) is adjustable by loosening the fastener 26 and moving the bracket member 14 in an adjustment direction D2, which is an angular or circumferential direction, and corresponds to the first adjustment direction of the appended claims. This can be accomplished by associating fastener 26 with multiple adjustment openings or an elongated bore defined in the band member 32 (similar to the embodiments described above) or by some other slidable or movable relationship between the bracket member 14 and clamp member 12 (band member 32). In this embodiment, the bracket member 14 is essentially rotatable or pivotal about axis A2.

Figure 8:
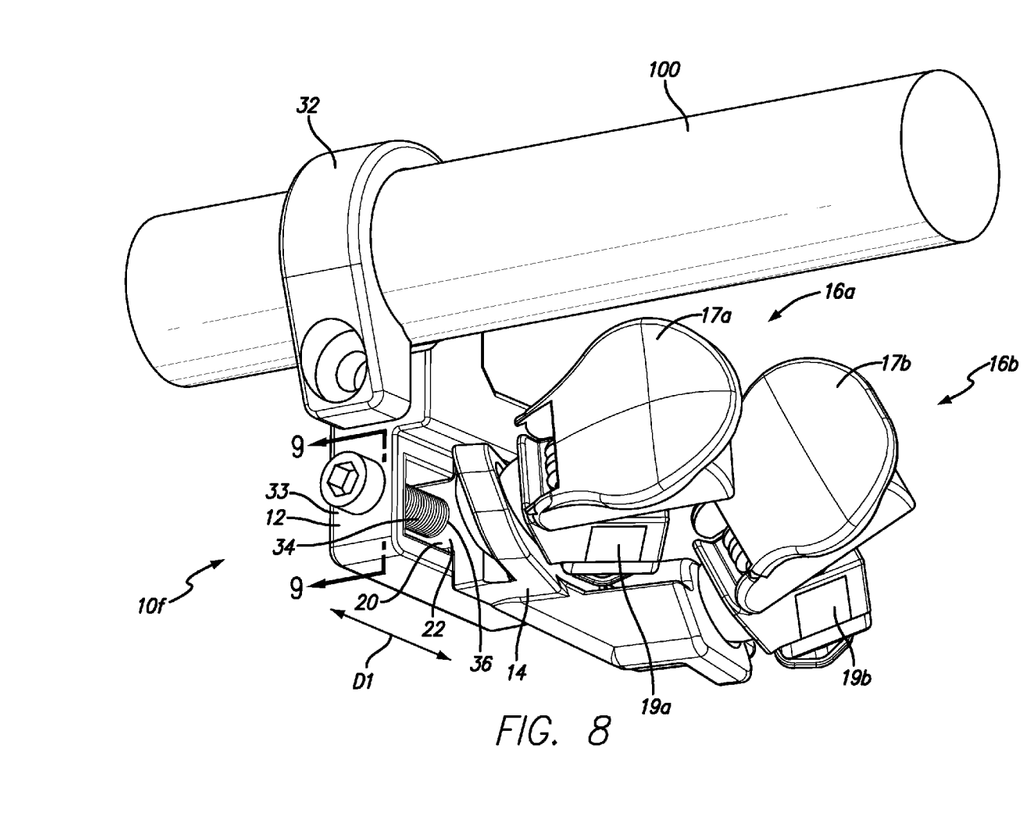
FIG. 8 is a perspective vim of an electric control device in accordance with another preferred embodiment of the present invention.
Figure 9:
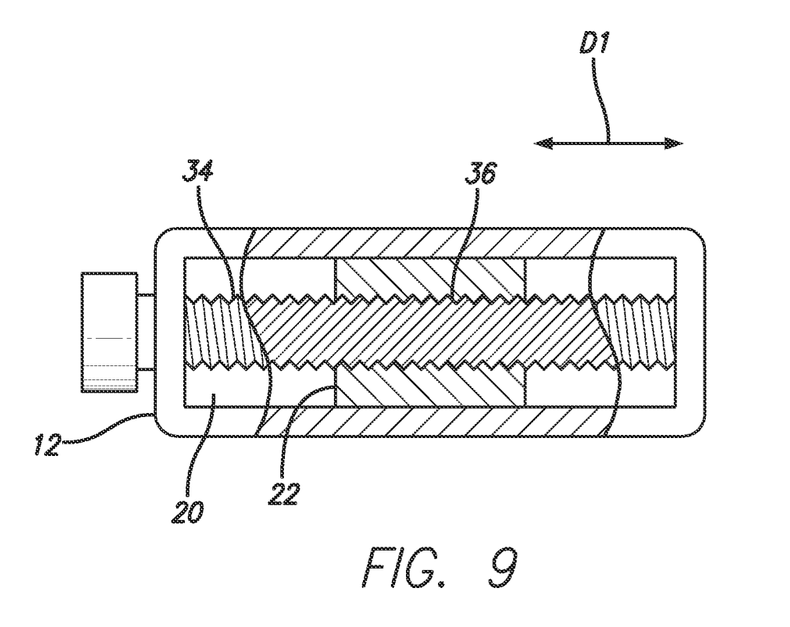
FIG. 9 is a cross-sectional view of a portion of the electric control device of FIG. 8.

FIGS. 8-9 show another embodiment of an electric control device 10f for a bicycle. In this embodiment, the guide portion 18 includes a threaded shaft 34 that spans the length of the channel portion 20 and extends through a threaded bore 36 defined in the protruding portion 22. In operation, when the threaded shaft 34 is rotated, the bracket member 14 moves in the adjustment direction D1.

Figure 10:
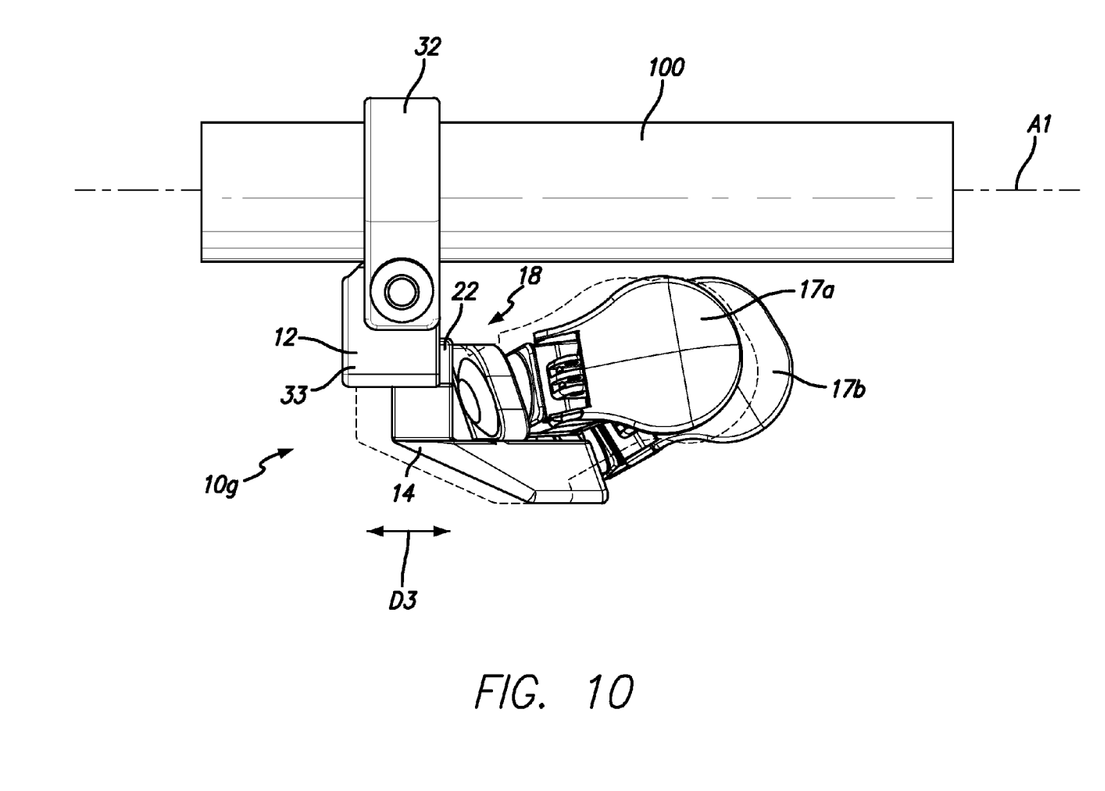
FIG. 10 is a rear elevational view of an electric control device in accordance with another preferred embodiment of the present invention.

FIG. 10 shows another embodiment of an electric control device 10g for a bicycle. In this embodiment, the bracket member 14 is adjustable toward an adjustment direction D3 which is generally parallel to the axis A1 defined by the bicycle handlebar 100 when the control device 10g is mounted on the bicycle handlebar 100.

Figure 11:
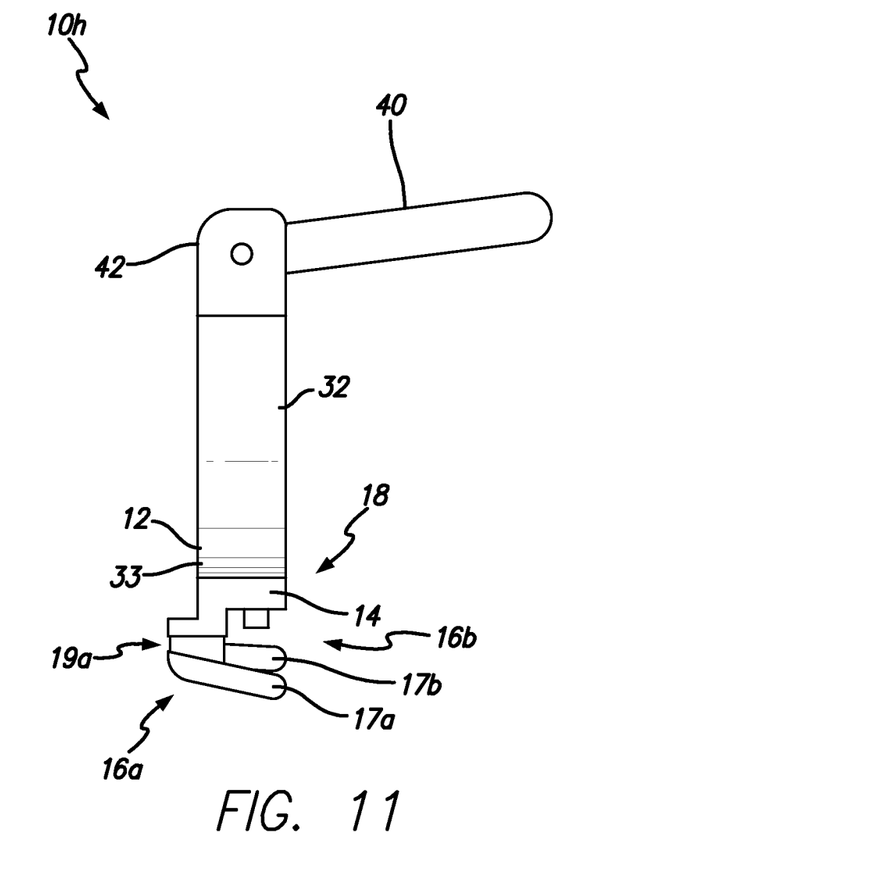
FIG. 11 is a schematic view of an electric control device in accordance with another preferred embodiment of the present invention.

FIG. 11 shows another embodiment of an electric control device 10h. In this embodiment, the electric control device 10h operates more than one bicycle component. For example, as shown in FIG. 11, the electric control device 10h can operate an electric shifting device, e.g., one of an electric front or rear derailleur (via first electric user interface member 16a) and a brake unit (via a brake lever or brake operating member 40). In a preferred embodiment, electric control device 10h includes clamp member 12, bracket member 14, first electric user interface member 16a, second electric user interface member 16b, and brake operating member 40, which is pivotally attached to a mounting portion 42 provided at the clamp member 12. Mounting portion 42 and clamp member 12 can be unitary or detachable from one another, so that different brake control members can be used. With respect to the adjustability of the position of the bracket member 14 (and first and second electric user interface members 16a and 16b) any of the adjustable methods or components described above can be used to adjust the position of bracket member 14 with respect to clamp member 12. In use, the clamp member 12 is attached to a bicycle handlebar.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member" or "element" when used in the singular can have the dual meaning of a single part or a plurality of parts. As used herein to describe the above embodiment(s), the following directional terms "forward," "rearward," "rightward," "leftward," "outward," "forward," "inward," "downward," "upward," "above," "below," "vertical," "horizontal," and "transverse" as we as any other similar directional terms refer to those directions of a bicycle equipped with the bicycle control device. Accordingly, these terms, as utilized to describe the bicycle control device should be interpreted relative to a bicycle equipped with the bicycle control device as used in the normal riding position on a level surface. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. Any claims intended to be treated under 35 U.S.C. §112, ¶6 will begin with the words "means for". Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An electric control device for a bicycle, the electric control device comprising:
    a band part that is adapted to be mounted to a bicycle handlebar, wherein the band part defines a handlebar opening,
    an extension portion extending from the band part,
    a bracket member adjustably mounted to the extension portion, wherein the bracket member is displaceable relative to the extension portion in at least a first adjustment direction and along an adjustment path, wherein the adjustment path is positioned below the handlebar opening when the control device is mounted on the bicycle handlebar, and
    a first electric user interface member operatively coupled to the bracket member.

2. The electric control device of claim 1 wherein the adjustment path is linear.

3. The electric control device of claim 2 wherein one of the extension portion and the bracket member includes a guide portion that extends in the first adjustment direction, wherein the other of the extension portion and the bracket member is operatively associated with the guide portion and is therefore displaceable in the first adjustment direction.

4. The electric control device of claim 3 wherein the guide portion includes an elongated bore defined therein that extends generally in the first adjustment direction.

5. The electric control device of claim 4 further comprising a fastener extending through the elongated bore and fixed to the other of the extension portion and the bracket member.

6. The electric control device of claim 3 wherein the guide portion includes at least first and second adjustment openings defined therein.

7. The electric control device of claim 6 further comprising a fastener extending through one of the first and second adjustment openings and fixed to the other of the extension portion and the bracket member, whereby the position of the bracket member can be adjusted by extending the fastener through the other of the first and second adjustment openings.

8. The electric control device of claim 3 wherein the other of the extension portion and the bracket member has a protruding portion, wherein the guide portion includes a channel portion, and wherein the protruding portion is received in the channel portion such that the protruding portion slides along the channel portion in the first adjustment direction.

9. The electric control device of claim 3 wherein the other of the extension portion and the bracket member has a protruding portion, wherein the guide portion includes a channel portion having a length, wherein the protruding portion is received in the channel portion, wherein the guide portion includes a threaded shaft that spans the length of the channel portion and extends through a threaded bore defined in the protruding portion, wherein when the threaded shaft is rotated, the bracket member moves in the first adjustment direction.

10. The electric control device of claim 2 wherein the first adjustment direction is perpendicular to an axis defined by the bicycle handlebar when the control device is mounted on the bicycle handlebar.

11. The electric control device of claim 2 wherein the first adjustment direction is parallel to an axis defined by the bicycle handlebar when the control device is mounted on the bicycle handlebar.

12. The electric control device of claim 2 wherein the band part defines a center axis, and wherein the first adjustment direction is an angular direction relative to the center axis of the band part.

13. The electric control device of claim 1 wherein the first electric user interface member includes a first lever member that pivots about a first lever axis.

14. The electric control device of claim 13 wherein the first electric user interface member further includes a first electric switch unit attached to the bracket member, wherein the first lever member operates the first electric switch unit.

15. The electric control device of claim 1 further comprising a second electric user interface member operatively coupled to the bracket member.

16. The electric control device of claim 15 wherein the second electric user interface member includes a second lever member that pivots about a second lever axis.

17. The electric control device of claim 16 wherein the second electric user interface member further includes a second electric switch unit attached to the bracket member, wherein the second lever member operates the second electric switch unit.

18. The electric control device of claim 1 wherein the extension portion extends downwardly from the band part when the control device is mounted on the bicycle handlebar.

19. An electric control device associated with a band part that is adapted to be mounted to a handlebar of a bicycle, wherein the band part defines a handlebar opening and includes an extension portion extending therefrom, and wherein the band part defines a center axis, the electric control device comprising:
  a bracket member adjustably mounted to the extension portion, wherein the bracket member is adjustable in a first adjustment direction, wherein the first adjustment direction is linear and is not parallel to the center axis, and
  a first electric user interface member operatively coupled to the bracket member.

20. An electric control device for a bicycle, the electric control device comprising:
  a band part that is adapted to be mounted to a bicycle handlebar, wherein the band part defines a handlebar opening,
  an extension portion extending from the band part,
  a brake operating member operatively mounted to the band part,
  a bracket member detachably mounted to the extension portion, wherein the bracket member is moveable along an adjustment path, wherein the adjustment path is positioned below the handlebar opening when the control device is mounted on the bicycle handlebar, and
  an electric control member including a user interface member, the electric control member operatively coupled to the bracket member.

* * * * *